US009835847B2

(12) United States Patent
Saari et al.

(10) Patent No.: US 9,835,847 B2
(45) Date of Patent: Dec. 5, 2017

(54) HYPERSPECTRAL IMAGING ARRANGEMENT

(71) Applicant: Teknologian tutkimuskeskus VTT Oy, Espoo (FI)

(72) Inventors: Heikki Saari, VTT (FI); Sami Siikanen, Kuopio (FI)

(73) Assignee: Teknologian Tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 15/459,164

(22) Filed: Mar. 15, 2017

(65) Prior Publication Data

US 2017/0269351 A1    Sep. 21, 2017

(30) Foreign Application Priority Data

Mar. 15, 2016  (FI) .................................. 20165213

(51) Int. Cl.
*G02B 26/00* (2006.01)
*H04N 5/225* (2006.01)
*H04N 5/33* (2006.01)

(52) U.S. Cl.
CPC ......... *G02B 26/001* (2013.01); *G02B 26/007* (2013.01); *H04N 5/2256* (2013.01); *H04N 5/332* (2013.01)

(58) Field of Classification Search
CPC .. G02B 26/001; G02B 26/007; H04N 5/2256; H04N 5/332
See application file for complete search history.

(56) References Cited

U.S. PATENT DOCUMENTS

| | | | |
|---|---|---|---|
| 5,130,998 A | 7/1992 | Wakata et al. | |
| 5,528,295 A | 6/1996 | Wagner | |
| 5,910,839 A | 6/1999 | Erskine | |
| 1,554,667 A1 | 6/2009 | Kampe | |
| 2002/0054614 A1 | 5/2002 | Jin | |
| 2002/0154662 A1 | 10/2002 | Turpin et al. | |
| 2002/0186741 A1 | 12/2002 | Kleinschmidt et al. | |
| 2006/0215713 A1 | 9/2006 | Flanders et al. | |
| 2008/0144001 A1 | 6/2008 | Heeg et al. | |
| 2010/0097613 A1 | 4/2010 | Saari | |
| 2011/0170164 A1 | 7/2011 | Wang et al. | |
| 2012/0140981 A1 | 6/2012 | Berkman et al. | |
| 2013/0341509 A1 | 12/2013 | Nelson et al. | |
| 2014/0093147 A1 | 4/2014 | Stewart et al. | |

FOREIGN PATENT DOCUMENTS

| | | |
|---|---|---|
| CA | 2059134 A1 | 10/1991 |
| WO | 1997/31278 A1 | 8/1997 |

OTHER PUBLICATIONS

Finnish Patent and Registration Office Search Report, Application No. 20165213, dated Jul. 5, 2016, 2 pages.

(Continued)

*Primary Examiner* — Gevell Selby
(74) *Attorney, Agent, or Firm* — Ziegler IP Law Group, LLC

(57) ABSTRACT

An arrangement for hyperspectral imaging, comprising an imaging sensor (170,270); a band-pass filter element (130, 230): at least one imaging optics element (120,160,220,260) configured to form an image on the imaging sensor (170, 270); and a first adjustable multi passband filter (150a,255); wherein the first (150a,255) adjustable multi passband filter is configured to be adjusted by tilting.

18 Claims, 6 Drawing Sheets

(56) References Cited

OTHER PUBLICATIONS

Finnish Patent and Registration Office Communication of Acceptance, Application No. 20165213, dated Nov. 9, 2016, 4 pages.
International Search Report received for International Patent Application No. PCT/FI2017/050155, dated Jun. 5, 2017, 15 pages.
Jeong, Hyeong-Jun, et al., "Spectrally resolved fluorescence lifetime imaging microscope using tunable bandpass filters", Review of Scientific Instruments, vol. 83, 2012, pp. 93705-1-93705-5.

HYPERSPECTRAL IMAGING ARRANGEMENT

TECHNICAL FIELD

The present application generally relates to imaging. In particular, but not exclusively, the present application relates to hyperspectral imaging. More particularly, but not exclusively, the present application relates to use of multi passband filters, for example Fabry-Perot interferometers, combined with an RGB or a monochromatic image sensor in hyperspectral imaging.

BACKGROUND

This section illustrates useful background information without admission of any technique described herein being representative of the state of the art.

Hyperspectral, or multispectral imaging, is increasingly used in numerous applications and accordingly, cost effective and simple arrangements are needed.

Previously hyperspectral imaging has been performed for example by using pixelized multispectral filters, by using a filter wheel and by using multiplexed LED illumination. Such arrangements often require complex manufacturing processes and are not easily adaptable to different spectral wavelength ranges. In these arrangements it is not possible to adjust wavelength continuously because the pixelized multispectral filters are permanently on top of pixels and the filter wheel can only have a fixed number of filters, typically from 3 to 12. Additionally, pixelized multispectral filters are not compatible with the use of compact-sized image sensors because the size of the pixelized filter limits the minimum pixel size.

Furthermore, the use of Fabry-Perot interferometers is known from previous publications U.S. Pat. No. 8,130,380 B and US 2015124263 A1.

The present invention aims to mitigate the problems of the previous solutions by providing a hyperspectral imaging arrangement that can be used to build a cost effective high performance hyperspectral imaging arrangement that is also compatible with small pixel image sensors enabling the construction of very low cost hyperspectral imaging arrangements based on mobile device cameras.

SUMMARY

Various aspects of examples of the invention are set out in the claims.

According to a first example aspect of the present invention, there is provided an arrangement for hyperspectral imaging, comprising an imaging sensor;
a band-pass filter element:
at least one imaging optics element configured to form an image on the imaging sensor; and
a first adjustable multi passband filter; wherein
the first adjustable multi passband filter is configured to be adjusted by tilting.

The arrangement may further comprise a second adjustable multi passband filter.

The first and/or the second multi passband filter may comprise an adjustable Fabry-Perot interferometer.

At least one of the first and the second adjustable Fabry-Perot interferometer may be configured to have a fixed gap and to be adjusted by tilting.

Both the first and the second adjustable Fabry-Perot interferometer may configured to have a fixed gap and to be adjusted by tilting.

The first adjustable Fabry-Perot interferometer may be configured to have a fixed gap and to be adjusted by tilting and the second adjustable Fabry-Perot interferometer may be configured to be adjusted by adjusting the gap.

The arrangement may further comprise an array of light emitting diodes configured to illuminate the target to be imaged; each light emitting diode having a wavelength different from the other light emitting diodes.

The band-pass filter element may comprise a short-pass filter and a long-pass filter.

The band-pass filter element may be configured to pass a predetermined wavelength range of 360 to 1100 nm or 450 to 850 nm.

The first and the second adjustable Fabry-Perot interferometer may be configured to be adjusted by tilting in the same angle in opposite directions.

The imaging sensor may comprise a monochromatic or RGB image sensor.

The imaging sensor may be comprised in a portable electronic device.

According to a second example aspect of the present invention, there is provided a multi passband filter arrangement for hyperspectral imaging, comprising a first adjustable multi passband filter; wherein
the first adjustable multi passband filter is configured to be adjusted by tilting.

The arrangement may further comprise a second adjustable multi passband filter.

The first and/or the second multi passband filter may comprise an adjustable Fabry-Perot interferometer.

At least one of the first and the second adjustable Fabry-Perot interferometer may be configured to have a fixed gap and to be adjusted by tilting.

Both the first and the second adjustable Fabry-Perot interferometer may be configured to have a fixed gap and to be adjusted by tilting.

The first adjustable Fabry-Perot interferometer may be configured to have a fixed gap and to be adjusted by tilting and the second adjustable Fabry-Perot interferometer may be configured to be adjusted by adjusting the gap.

According to a third example aspect of the present invention, there is provided a method for hyperspectral imaging, comprising
providing an image with an imaging sensor;
adjusting a first adjustable multi passband filter to provide the required
transmission properties in order to receive at the imaging sensor the required wavelengths; wherein
the first adjustable multi passband filter is configured to be adjusted by tilting.

The method may further comprise adjusting a second adjustable multi passband filter to provide the required transmission properties in order to receive at the imaging sensor the required wavelengths.

The first and/or the second multi passband filter may comprise an adjustable Fabry-Perot interferometer.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The present invention and its potential advantages are understood by referring to FIGS. 1a through 3 of the drawings. In this document, like reference signs denote like parts or steps.

Figure 1A:
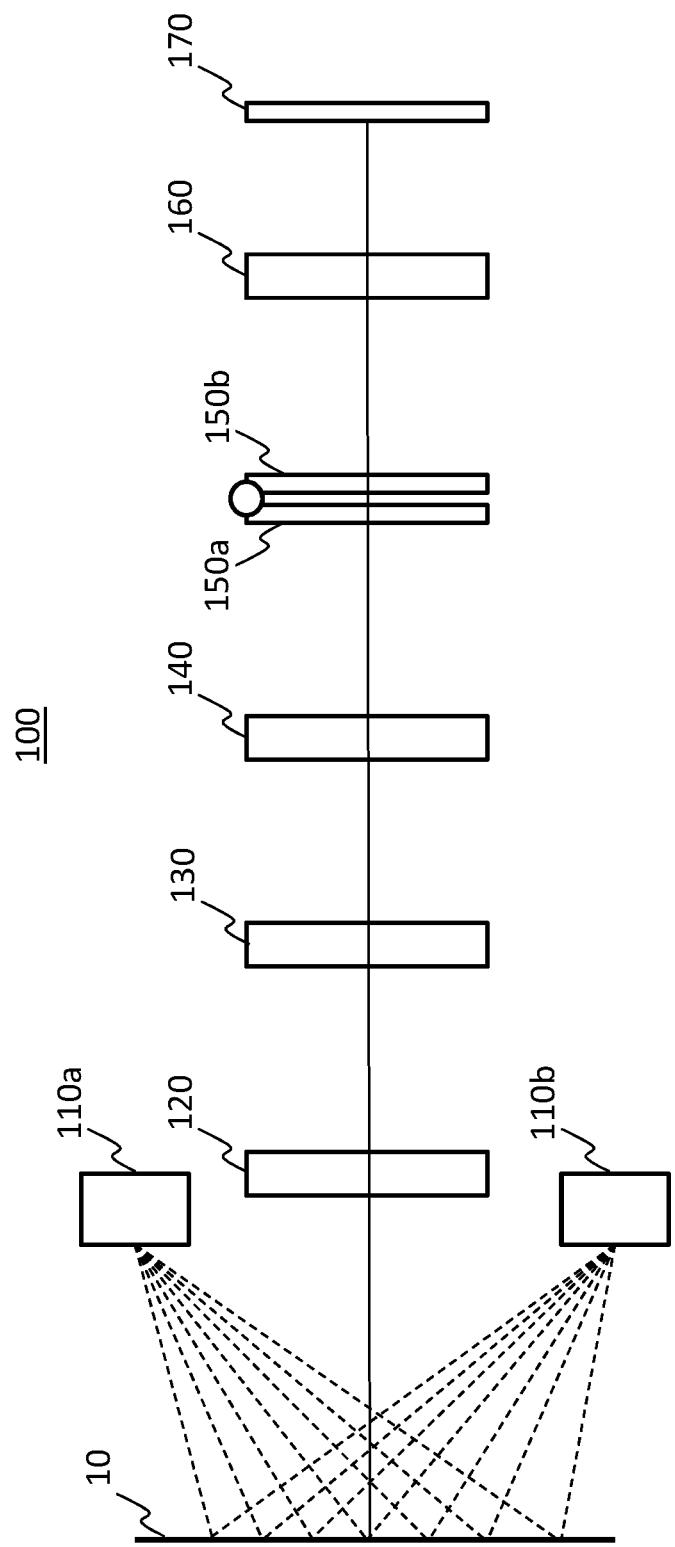
FIG. 1a shows a schematic principle view of a hyperspectral imaging arrangement according to an embodiment of the invention.
Figure 1B:
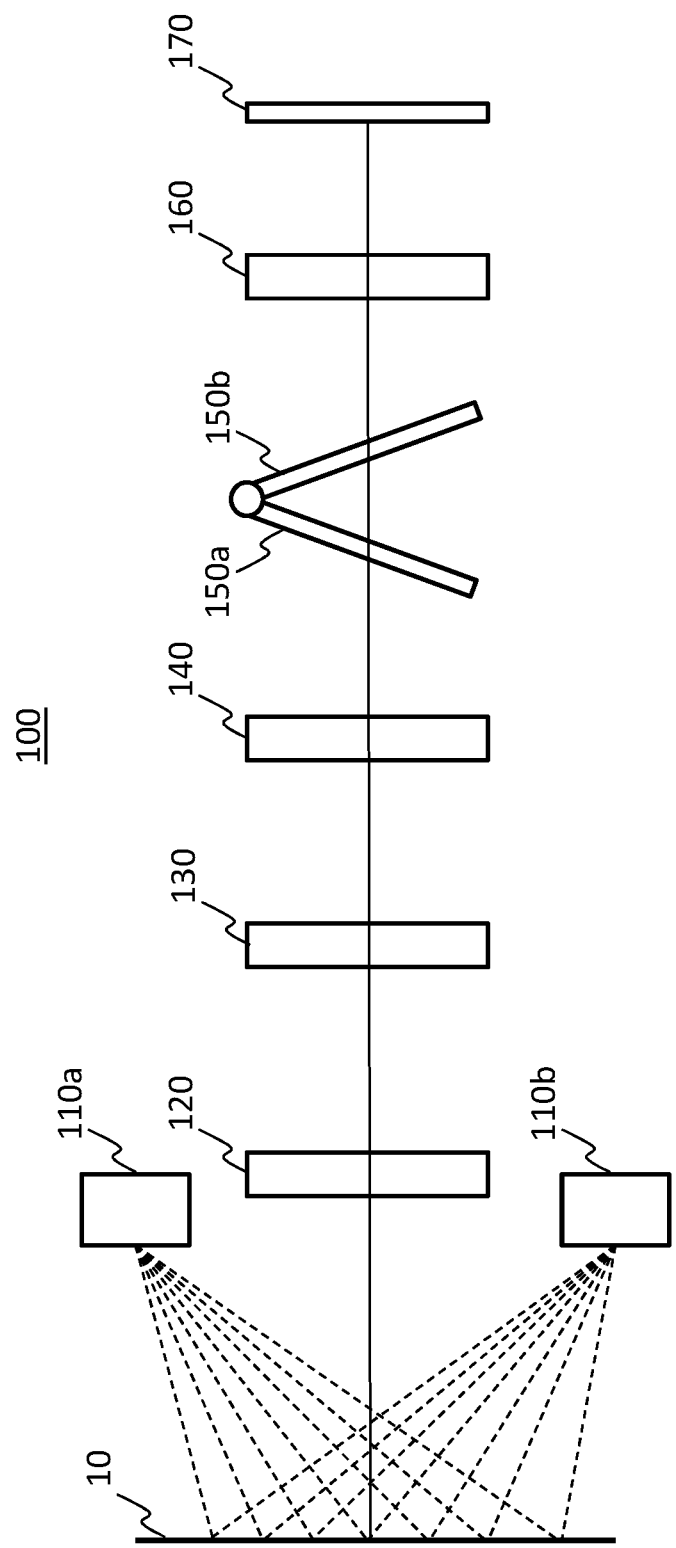
FIG. 1b shows a schematic principle view of a hyperspectral imaging arrangement according to an embodiment of the invention.

FIGS. 1a and 1b show schematic principle views of a hyperspectral imaging arrangement 100 according to an embodiment of the invention. FIGS. 1a and 1b show a target 10 to be imaged with hyperspectral imaging. The target 10 is for example a medical target, such as a healing wound, a target the color of which a consumer wishes to measure, an agricultural target, an anti-counterfeit marking target or a target in food processing. The target 10 is in an embodiment illuminated with an array 110a,110b of Light Emitting Diodes, LEDs, each LED in the array 110a,110b having a wavelength different from the other LEDs of the array 110a,110b. In an embodiment, the number of LEDs in the array 110a,110b is from 12 to 20. In a further example embodiment, the array 110a,110b is comprised in a single element or multiple elements although two elements have been depicted in FIGS. 1a and 1b. In an embodiment, the LEDs of the array 110a,110b are configured to be turned on and off separately and independently. In an embodiment, the LEDs of the array 110a,110b cover a wavelength range of a typical low-cost Complementary Metal Oxide Semiconductor, CMOS, image sensor, for example a range of 360 to 1100 nm. In a further embodiment, the LEDs of the array 110a,110b cover a wavelength range of 450 to 850 nm. It is to be noted, that the hyperspectral imaging arrangement 100 will function without the LED illumination as well.

FIGS. 1a and 1b further show a first optical element 120, i.e. imaging optics element, configured to form a collimated beam through the following elements. The hyperspectral imaging arrangement 100 further comprises a first band-pass filter element 130. In an embodiment, the first band-pass filter element comprises a long-pass filter and a short pass filter configured to pass a predetermined wavelength range, such as 360 to 1100 nm or 450 to 850 nm. In an embodiment, the hyperspectral imaging arrangement 100 further comprises a second optical element 140 configured to guide the beam towards following elements.

The hyperspectral imaging arrangement 100 comprises a first adjustable multi passband filter, for example a Fabry-Perot Interferometer, FPI, 150a and, in an embodiment, a second adjustable multi passband filter, for example a Fabry-Perot Interferometer, FPI, 150b. The first adjustable multi passband filter (150a) comprises in an embodiment a multi passband filter configured to be adjusted by tilting. In an embodiment, the first 150a and/or the second 150b FPI comprise tiltable, or rotatable, fixed gap FPIs. In an embodiment, the adjustable multi passband filters are configured to be tilted to the same angle in opposite directions as shown in FIG. 1b. in order to adjust the transmission properties. By tilting the multi passband filters 150a,150b in opposite directions with the same angle, the image is kept at a fixed position enabling the use of small sized image sensors as well. In an embodiment, the multi passband filters comprise FPIs 150a,150b comprising five layer Bragg mirrors on opposite sides of a fused silica wafer.

The hyperspectral imaging arrangement 100 further comprises a second optical element, or imaging optics element, 160 configured to form an image on the imaging sensor 170. In an embodiment, the imaging sensor comprises a RGB or monochromatic imaging sensor. The use of an RGB image sensor enables to register signal at three spectral bands simultaneously as for example explained in U.S. Pat. No. 8,130,380 B2. In an embodiment, the imaging sensor 170 is comprised in a further device, for example a portable electronic device, such as a digital camera, a smartphone or a tablet computer.

In a further embodiment, in addition to or instead of the first band-pass filter element 130, the hyperspectral imaging arrangement 100 comprises a second band-pass filter element (not shown) between the second optical element 160 and the imaging sensor 170. In an embodiment, the properties of the second band-pass filter element are similar to those of the first band-pass filter element 130.

Figure 2A:
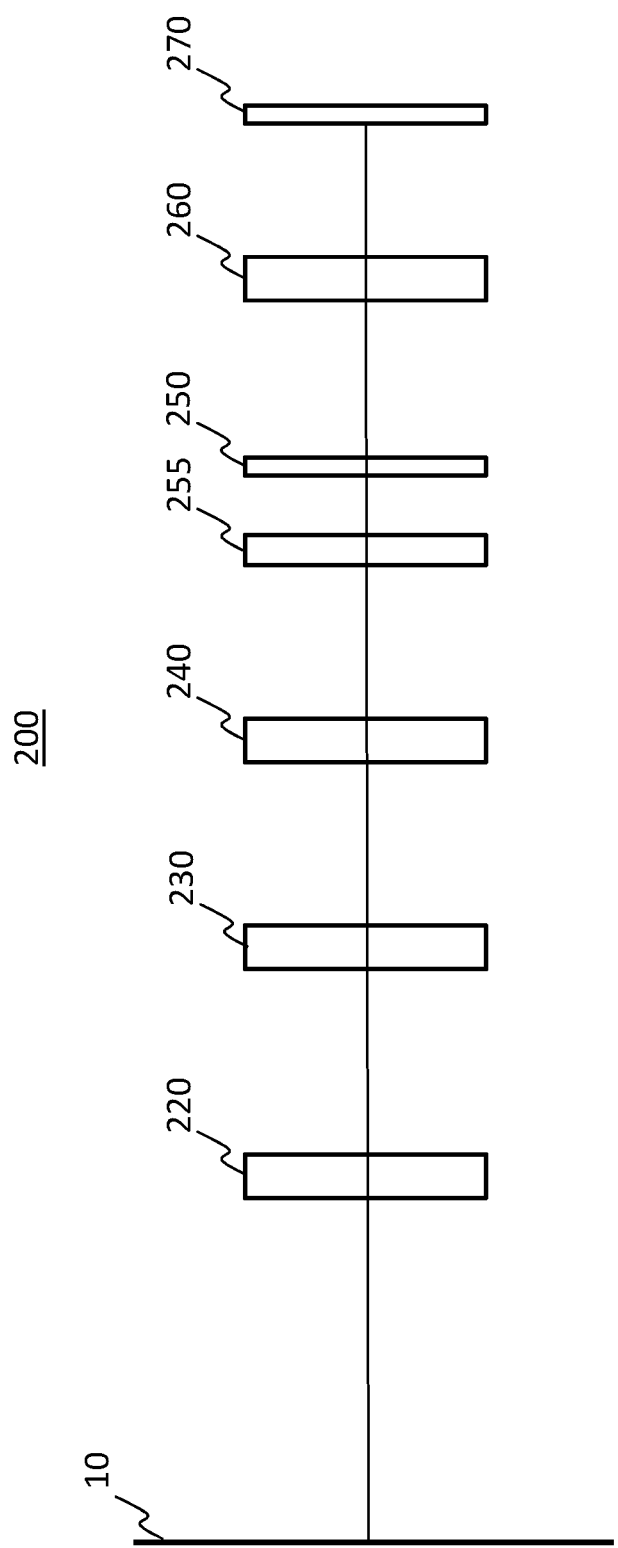
FIG. 2a shows a schematic principle view of a hyperspectral imaging arrangement according to a further embodiment of the invention.
Figure 2B:
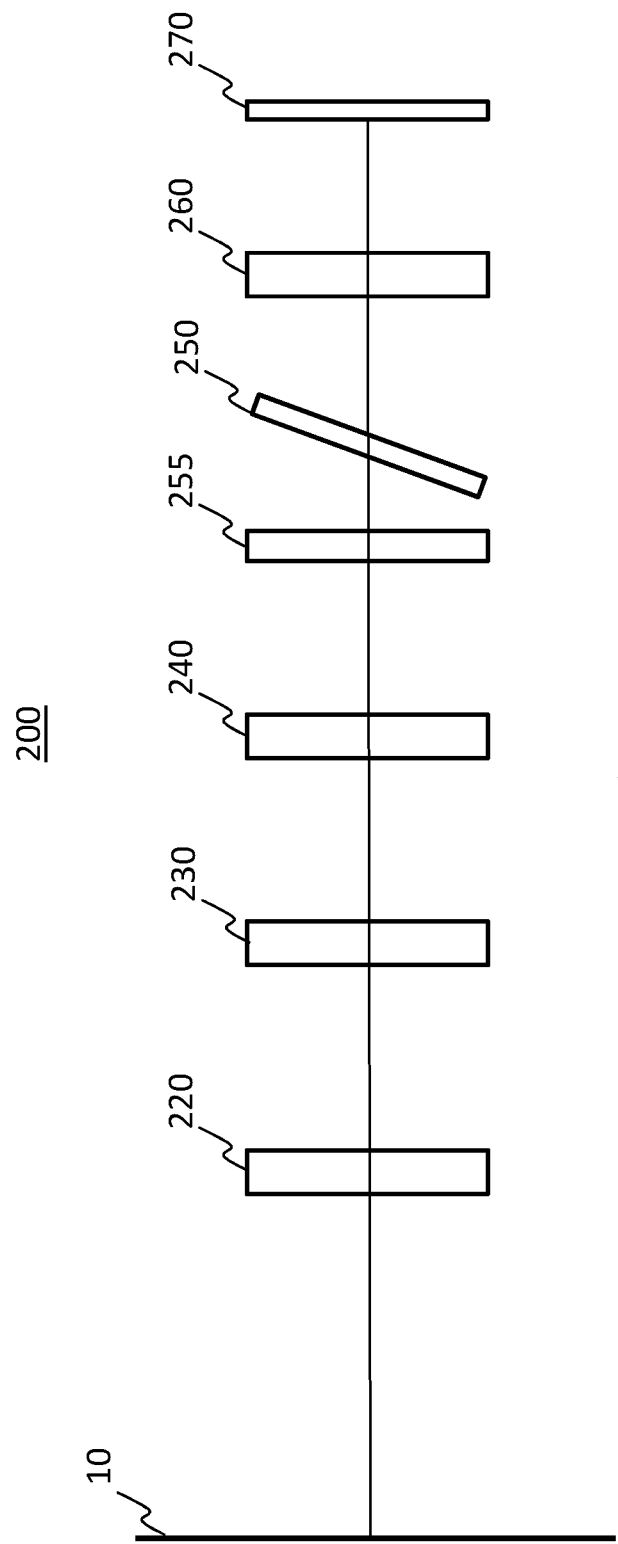
FIG. 2b shows a schematic principle view of a hyperspectral imaging arrangement according to a further embodiment of the invention.

FIGS. 2a and 2b show schematic principle views of a hyperspectral imaging arrangement 200 according to a further embodiment of the invention. FIGS. 2a and 2b show a target 10 to be imaged with hyperspectral imaging. The target 10 is for example a medical target, such as a healing wound, or a target the color of which a consumer wishes to measure.

FIGS. 2a and 2b further show a first optical element 220, i.e. imaging optics element, configured to form a collimated beam through the following elements. The hyperspectral imaging arrangement 200 further comprises a first band-pass filter element 230. In an embodiment, the first band-pass filter element comprises a long-pass filter and a short pass filter configured to pass a predetermined wavelength range, such as 360 to 1100 nm or 450 to 850 nm. In an embodiment, the hyperspectral imaging arrangement 200 further comprises a second optical element 240 configured to guide the beam towards following elements.

The hyperspectral imaging arrangement 200 comprises a first adjustable multi passband filter, for example a Fabry-Perot Interferometer, FPI, 255 and, in an embodiment, a second adjustable multi passband filer, for example a Fabry-Perot Interferometer, FPI, 250. The first adjustable multi passband filter (255) comprises in an embodiment a multi passband filter configured to be adjusted by tilting. In an embodiment, the first adjustable FPI 255 comprises a piezo-actuated adjustable gap FPI and the second adjustable FPI 250 comprises a tiltable fixed gap FPI. The combination of the first 255 and the second 250 multi passband filter is in an embodiment configured to be adjusted in such a way that substantially only a single spectral band is transmitted through in turn allowing for the use of a monochromatic imaging sensor.

The hyperspectral imaging arrangement 200 further comprises a second optical element, or imaging optics element, 260 configured to form an image on the imaging sensor 270. In an embodiment, the imaging sensor comprises a RGB or monochromatic imaging sensor. In an embodiment, the imaging sensor 270 is comprised in a further device, for example a portable electronic device, such as a digital camera, a smartphone or a tablet computer.

In a further embodiment, in addition to or instead of the first band-pass filter element 230, the hyperspectral imaging arrangement 200 comprises a second band-pass filter element (not shown) between the second optical element 260 and the imaging sensor 270. In an embodiment, the properties of the second band-pass filter element are similar to those of the first band-pass filter element 230. Furthermore, in a still further embodiment, the hyperspectral imaging arrangement 200 comprises an array of Light Emitting Diodes, LEDs, for illuminating the target 10 similar to the array described with reference to FIGS. 1a and 1b.

Figure 3A:
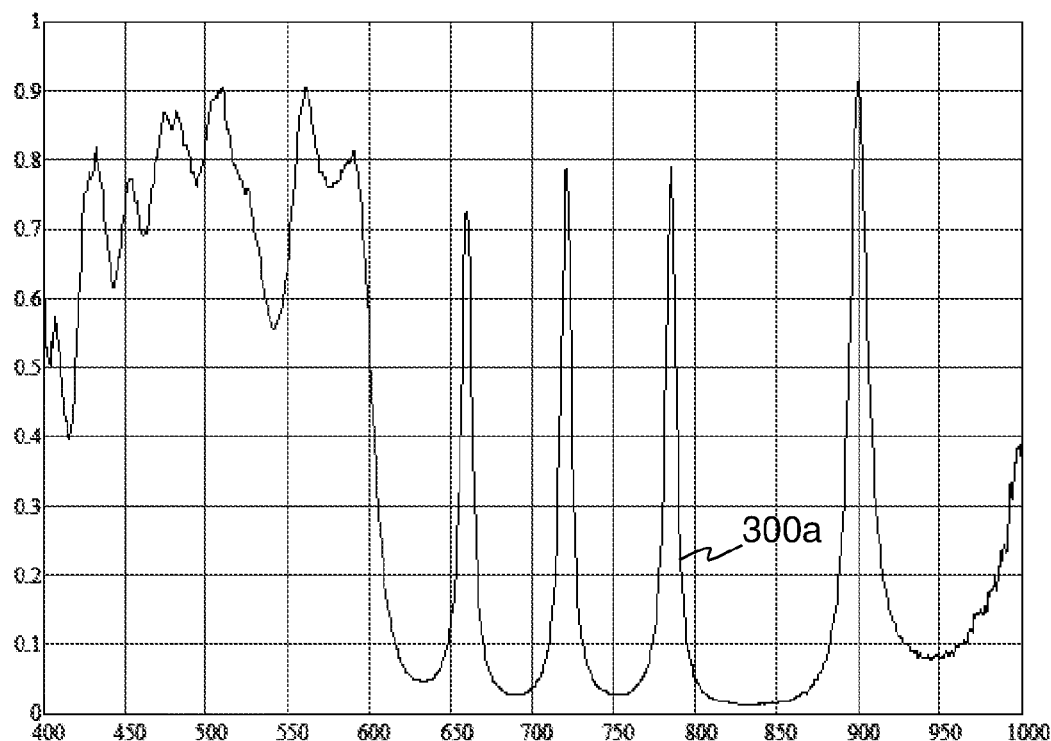
FIG. 3a shows an example of transmission properties of the adjustable multi passband filters of the hyperspectral imaging arrangement according to an embodiment of the invention.
Figure 3B:
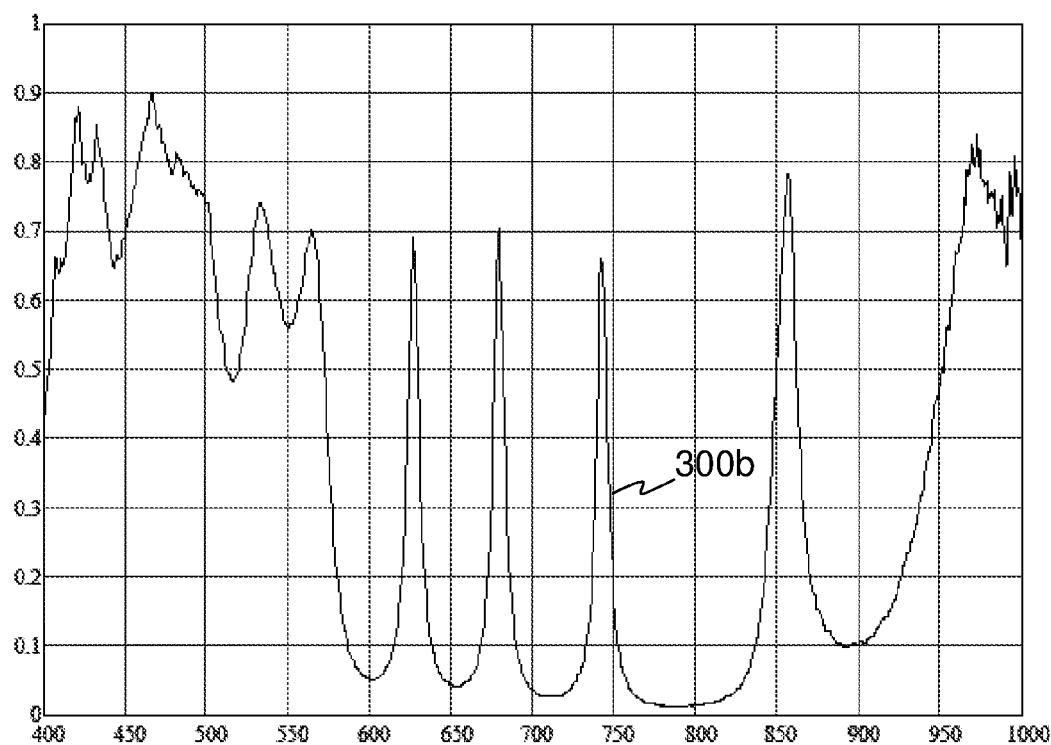
FIG. 3b shows a further example of transmission properties of the adjustable multi passband filters of the hyperspectral imaging arrangement according to an embodiment of the invention.

FIGS. 3a and 3b show examples of transmission properties of the adjustable multi passband filter of the hyperspectral imaging arrangement according to an embodiment of the invention. In the example, the multi passband filter comprises tiltable Fabry Perot interferometer comprising five layer $TiO_2$—$SiO_2$ dielectric Bragg mirrors optimized for 750 nm. FIG. 3a shows a graph 300a of the transmission properties with a tilt angle of 0 degrees as a function of wavelength in nanometers and FIG. 3b shows a graph 300b of the transmission properties with a tilt angle of 30 degrees as a function of wavelength in nanometers.

Figure 4:
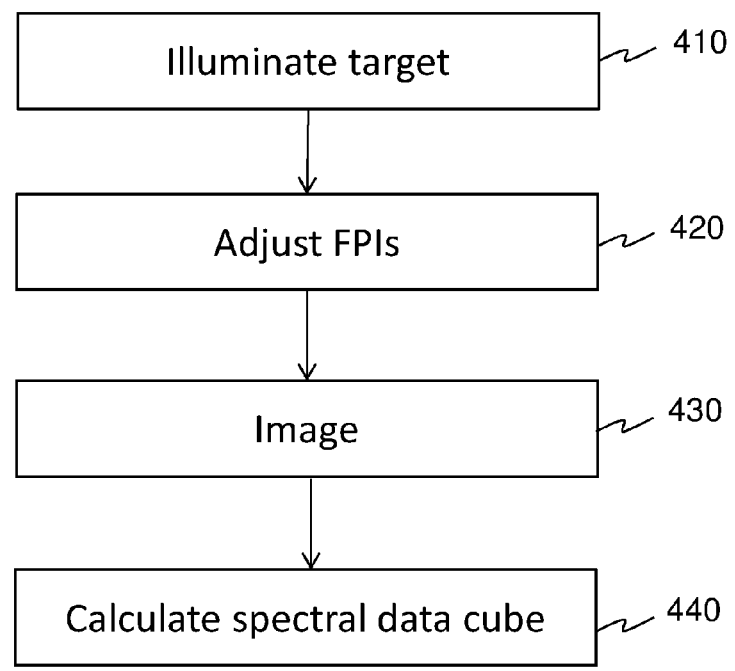
FIG. 4 shows a flowchart of a method for hyperspectral imaging according to an embodiment of the invention.

FIG. 4 shows a flowchart of a method for hyperspectral imaging according to an embodiment of the invention. At step 410 the target 10 to be imaged is illuminated. In an embodiment, the illumination is provided by an array 110a, 110b of Light Emitting Diodes as hereinbefore described with reference to FIGS. 1a and 1b. In a further embodiment, the ambient light is sufficient to illuminate the target.

At 420, the multi passband filters 150a,150b,250,255, for example the FPIs, are adjusted to provide the required transmission properties in order to receive at the imaging sensor 170,270 the required wavelengths in order to provide the hyperspectral image raw data at 430. At step 440 a hyperspectral data cube is calculated from the RGB or monochromatic image sensor raw image data. In an embodiment, the calculation is carried out for example using the calibration carried out for the hyperspectral imaging arrangement as explained in U.S. Pat. No. 8,130,380 B2.

Without in any way limiting the scope, interpretation, or application of the claims appearing below, a technical effect of one or more of the example embodiments disclosed herein is a low-cost arrangement for hyperspectral imaging. Another technical effect of one or more of the example embodiments disclosed herein is the provision of an arrangement applicable with common imaging sensors such as smartphone camera imaging sensors. Another technical effect of one or more of the example embodiments disclosed herein is the provision of hyperspectral imaging with sufficient spectral bands in ambient light.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An arrangement for hyperspectral imaging, comprising an imaging sensor (170,270);
   a band-pass filter element (130,230):
   at least one imaging optics element (120,160,220,260) configured to form an image on the imaging sensor (170,270); and
   a first adjustable multi passband filter (150a,255) and a second adjustable multi passband filter (150b,250); wherein that the first adjustable multi passband filter (150a,255) and the second adjustable multi passband filter (150b,250) are positioned consecutively on the optical path; and in that
   at least one of the first (150a) and the second (150b) adjustable multi passband filter is configured to be adjusted by tilting.

2. The arrangement of claim 1, wherein the first (150a) and/or the second (150b) multi passband filter comprise an adjustable Fabry-Perot interferometer.

3. The arrangement of claim 2, wherein at least one of the first (150a) and the second (150b) adjustable Fabry-Perot interferometer is configured to have a fixed gap and to be adjusted by tilting.

4. The arrangement of claim 2, wherein both the first (150a) and the second (150b) adjustable Fabry-Perot interferometer is configured to have a fixed gap and to be adjusted by tilting.

5. The arrangement of claim 2, wherein the first adjustable Fabry-Perot interferometer (255) is configured to have a fixed gap and to be adjusted by tilting and the second adjustable Fabry-Perot interferometer (250) is configured to be adjusted by adjusting the gap.

6. The arrangement of claim 1, further comprising an array (110a,110b) of light emitting diodes configured to illuminate the target (10) to be imaged; each light emitting diode having a wavelength different from the other light emitting diodes.

7. The arrangement of claim 1, wherein the band-pass filter element (130,230) comprises a short-pass filter and a long-pass filter.

8. The arrangement of claim 1, wherein the band-pass filter element (130,230) is configured to pass a predetermined wavelength range of 360 to 1100 nm or 450 to 850 nm.

9. The arrangement of claim 4, wherein the first (150a) and the second (150b) adjustable Fabry-Perot interferometer are configured to be adjusted by tilting in the same angle in opposite directions.

10. The arrangement of claim 1, wherein the imaging sensor (170,270) comprises a monochromatic or RGB image sensor.

11. The arrangement of claim 1, wherein the imaging sensor (170,270) is comprised in a portable electronic device.

12. A multi passband filter arrangement for hyperspectral imaging, comprising
a first adjustable multi passband filter (150a,255) and a second adjustable multi passband filter (150b,250); wherein that
the first adjustable multi passband filter (150a,255) and the second adjustable multi passband filter (150b,250) are positioned consecutively on the optical path; and in that
at least one of the first (150a) and the second (150b) adjustable multi passband filter is configured to be adjusted by tilting.

13. The arrangement of claim 12, wherein the first (150a) and the second (150b) multi passband filter comprise an adjustable Fabry-Perot interferometer.

14. The arrangement of claim 13, wherein at least one of the first (150a) and the second (150b) adjustable Fabry-Perot interferometer is configured to have a fixed gap and to be adjusted by tilting.

15. The arrangement of claim 13, wherein both the first (150a) and the second (150b) adjustable Fabry-Perot interferometer is configured to have a fixed gap and to be adjusted by tilting.

16. The arrangement of claim 13, wherein the first adjustable Fabry-Perot interferometer (255) is configured to have a fixed gap and to be adjusted by tilting and the second adjustable Fabry-Perot interferometer (250) is configured to be adjusted by adjusting the gap.

17. A method for hyperspectral imaging, comprising providing an image with an imaging sensor (170,270);

adjusting a first adjustable multi passband filter (150a, 255) and a second adjustable multi passband filter (150b,250) to provide the required transmission properties in order to receive at the imaging sensor (170, 270) the required wavelengths; wherein the first adjustable multi passband filter (150a,255) and the second adjustable multi passband filter (150b,250) are positioned consecutively on the optical path; and wherein at least one of the first (150a) and the second (150b) adjustable multi passband filter is configured to be adjusted by tilting.

18. The method of claim 17, wherein the first (150a) and/or the second (150b) multi passband filter comprise an adjustable Fabry-Perot interferometer.

* * * * *